UNITED STATES PATENT OFFICE.

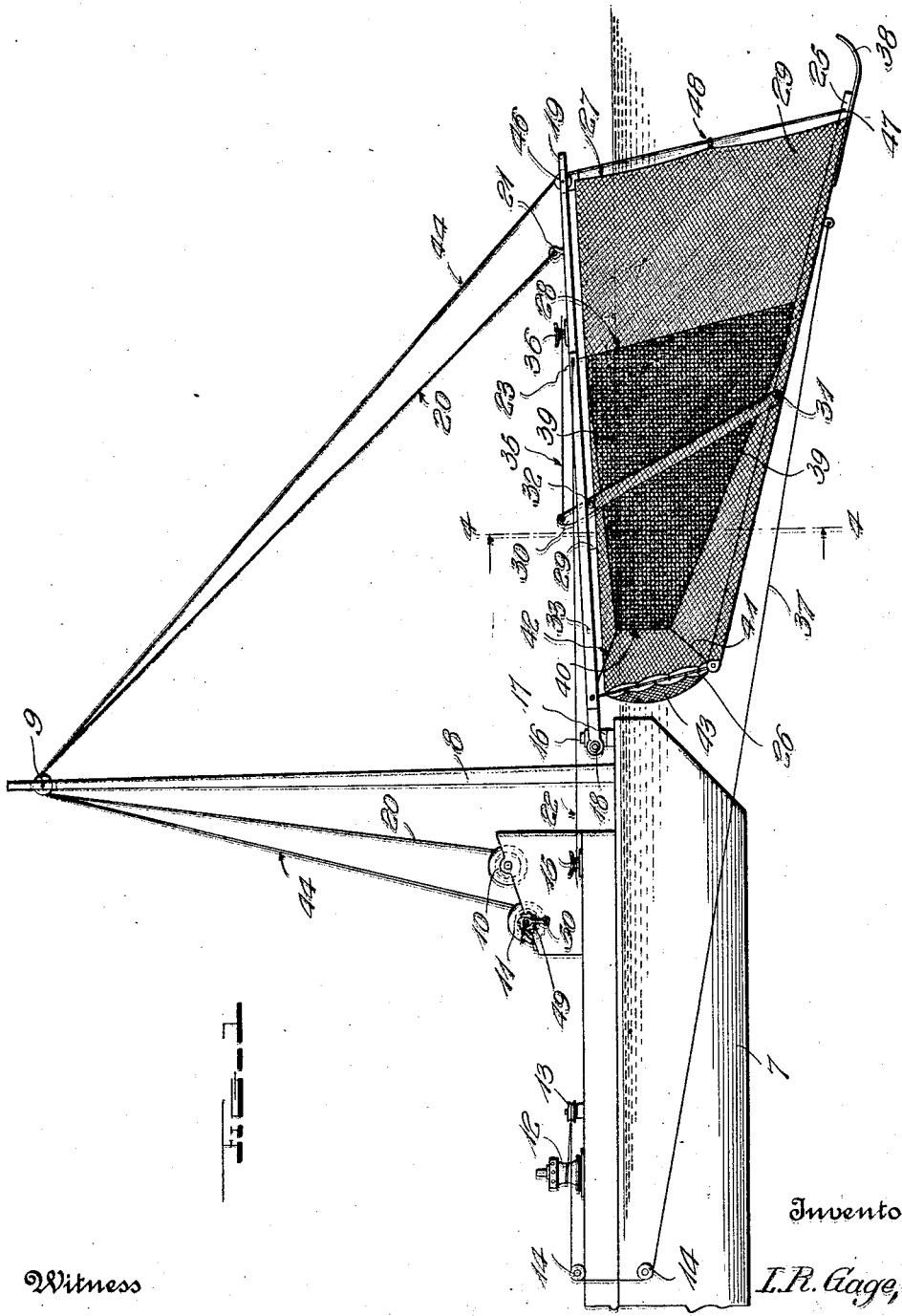

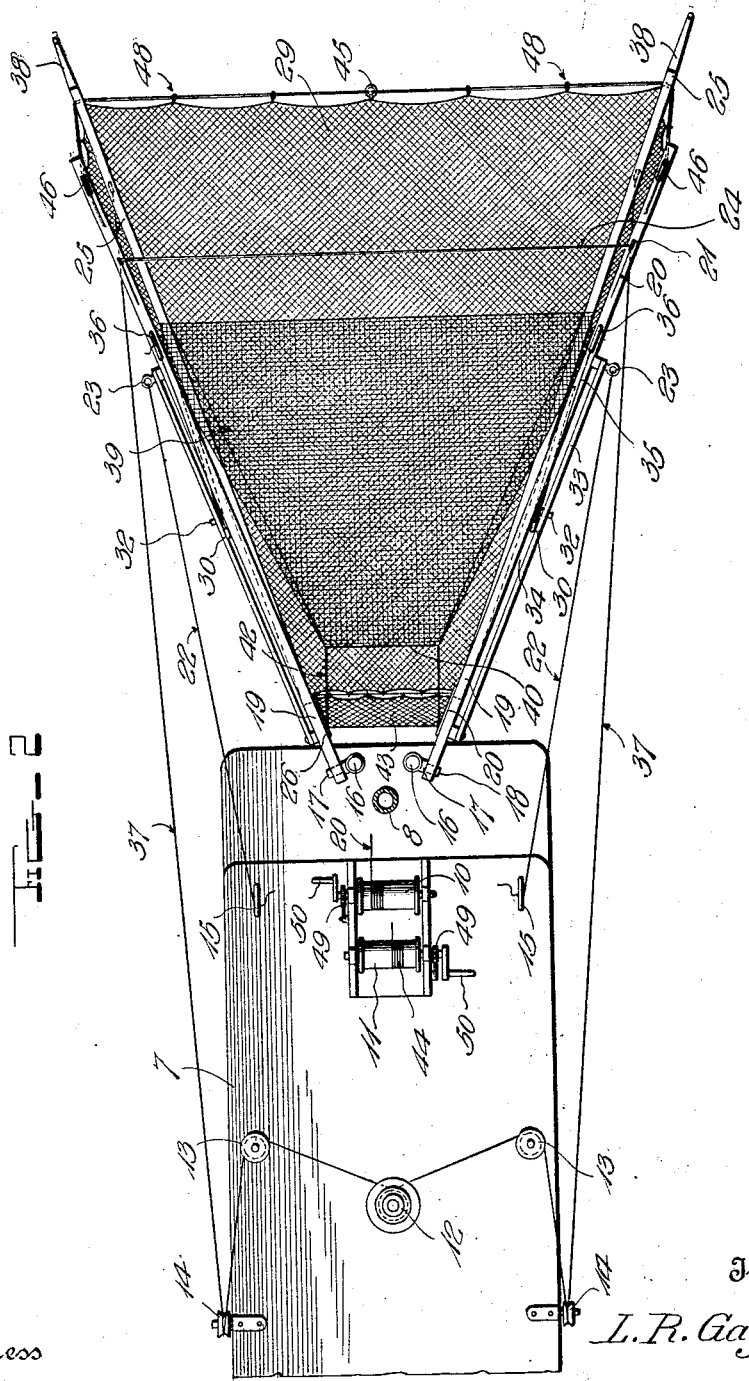

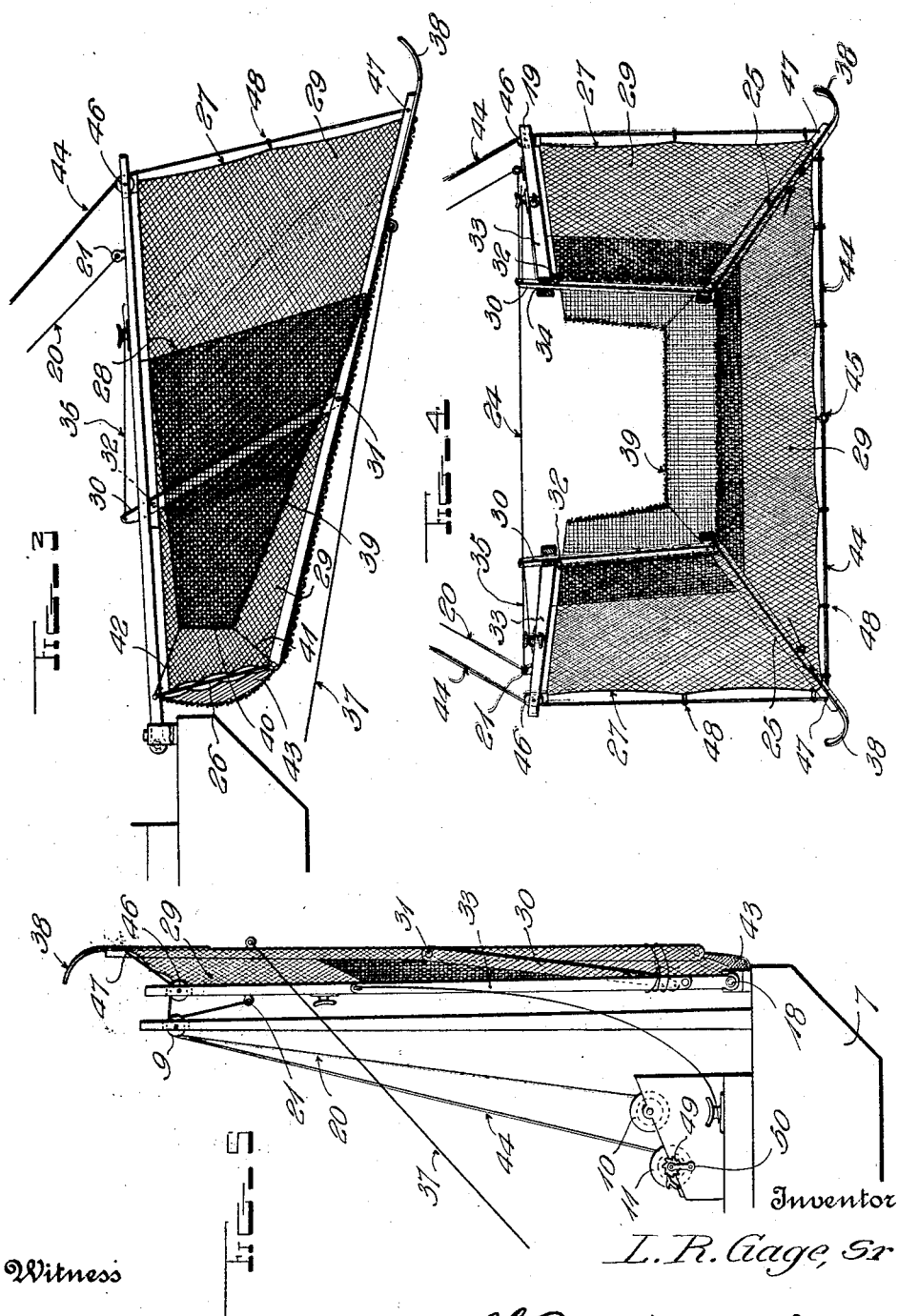

LORENZO R. GAGE, SR., OF HOQUIAM, WASHINGTON.

FISHING DEVICE.

1,304,302.  Specification of Letters Patent.  Patented May 20, 1919.

Application filed June 13, 1918. Serial No. 239,865.

*To all whom it may concern:*

Be it known that I, LORENZO R. GAGE, Sr., a citizen of the United States, residing at Hoquiam, in the county of Grays Harbor and State of Washington, have invented certain new and useful Improvements in Fishing Devices; and I do declare the following to be a full, clear, and exact description of the invention, such as will enable others skilled in the art to which it appertains to make and use the same.

This invention relates to fishing devices, and it relates more particularly to an improved scoop-net and operating means therefor.

One object of this invention is to provide a device of this character which may be attached to the bow of any boat, barge, float or other craft and which may be supported and propelled thereby so as to scoop up whatever fish are in its course;

Another object is to provide a device of this character which may be quickly, easily and conveniently folded while remaining attached to the supporting craft and which when thus folded will quickly drain and dry, while being thus disposed out of the way;

Another object is to provide effective and practical means for simultaneously folding and hoisting the net;

Another object is to provide effective and practical means for holding the net stretched in its proper relation to the supporting craft;

Another object is to provide a device of this character which is harmless to small fish;

Another object is to provide a device of this character which is simple and comparatively inexpensive to construct install and operate; and—

Another object is to provide a device of this character which is strong, durable, efficient and thoroughly practical.

Other objects and advantages may become apparent to persons who read the following details of description in connection with the accompanying drawings, in which:

Figure 1 is a side elevation of a barge or similar craft and of my improved fishing device attached to the craft;

Fig. 2 is a top plan view of the structure disclosed in Fig. 1;

Fig. 3 is a vertical sectional view taken on a plane extending from front to rear of the device;

Fig. 4 is a transverse vertical sectional view taken along the line 4—4 of Fig. 1; and—

Fig. 5 is a view somewhat similar to Fig. 1 but disclosing the net folded or collapsed and supported in a substantially vertical and out-of-the-way position.

Referring to these drawings in detail, in which similar reference characters correspond with similar parts throughout the several views, the barge or craft 7 may be of any type of floating vessel, and it may be self propelled or otherwise moved forward through the water. A mast 8 is secured on the bow of the craft, and one or more pulleys or sheave wheels 9 may be journaled in suitable bearings at the top portion of the mast. The vessel or craft 7 is also provided with winches 10 and 11, a capstan 12, pulleys or sheave wheels 13 and 14, cleats 15, and vertical studs or pivots 16.

Upon each of the studs 16 is journaled a universal joint element 17, and each of these elements 17 is provided with a pivot element 18 on which is journaled a boom 19. From the foregoing, it will be seen that the booms 19 may be swung from the horizontal position shown in Fig. 1 to the vertical position shown in Fig. 5, and that they may be swung from the forwardly diverging relation to a substantially parallel relation with one another, this being true because of the universal or double-hinge elements 17. The booms 19 are held in their normally horizontal position by means of ropes or cables 20, each of these cables having one end secured to the winch 10 and having its other end secured to the front end of one of the booms at 21. The winch 10, therefore, is not only operable for retaining the operative position of the booms, but is also operable for raising them in the position shown in Fig. 5. In order to retain the booms in their normally forwardly diverging relation, as shown in Fig. 2, a pair of ropes or cables 22 is employed, each of these cables having one end secured to the booms at 23 and having its other end secured to one of the cleats 15. By means of these cables or guys 22 and the elements 15 and 23, and a coöperative guy or cable 24, the booms are normally prevented from swinging on their pivots 16.

A pair of beams 25 are located substantially under the booms 19 and are connected thereto by means of cables or other flexible elements 26, 27 and 28. A scoop-net 29 extends approximately from end to end of the booms 19 and beams 25 and has its upper edges secured to the booms 19 through the medium of the flexible elements 26, 27 and 28, and by such additional connections as may be desirable; and the intermediate portion of the net 29 extends under the beams 25 and is secured thereto. Although I have described the element 29 as a net, it is to be understood that parallel strips of wood or metal may be employed in lieu of the net; in other words, the term net is intended to include any structure which will allow the passage of material therethrough without allowing the passage of fish of a considerable size; and moreover, the net 29 may be an integral structure or may consist of separate bottom and side walls.

In order to stretch the side walls of the net, I provide a pair of bars or adjustable struts 30 which are pivoted at 31 to the middle portions respectively, of the beams 25. Each of the bars 30 is provided with a stud or shoulder 32 which bears against the lower side of a bar 33, the latter having its ends secured to a corresponding one of the booms 19. The middle portion of each bar 33 is spaced from the corresponding boom so as to provide a slot 34 in which the upper end of each strut 30 is slidable transversely of itself and longitudinally of the booms. Pulleys, cables, or other flexible elements 35 each have one end connected to the upper end of one of the struts 30 and has its other end connected to the corresponding boom 19 through the medium of a cleat 36. From the foregoing description of the adjustable strut 30 and its adjuncts, it will be seen that the said walls of the net 29 may be stretched by pulling the cable 35 forward and thereby causing the shoulders 32 and pivots 31 to press the corresponding booms and beams away from one another; and that the struts may be held in any adjusted position by means of the cables 35 and cleats 36. In lieu of the cleats 36, I may employ pulleys, and extend the cables 35 therearound and back to the craft 7 so as to be conveniently manipulated by a person on the craft.

In order that the net and its adjuncts may not be raised by the action of the waves or other influences, a pair of adjustable guys 37 have their front ends secured to the beams 25 and have their rear ends secured to the capstan 12, the intermediate portion of each guy or cable 37 extending around the sheaves or pulleys 13 and 14.

For the purpose of preventing the beam 25 from becoming engaged with the bed of a river or body of water, I provide each of the beams 25 with a skid or shoe 38 which has upturned forward ends. These elements also protect the front portion of the net 29 by keeping it out of contact with obstructions at the bottom of the body of water.

In order that the fish may be entrapped within the net 29, I provide the latter with an internal net 39 which has its front end secured to the flexible element 28 the latter being secured also to the net 29, and by this construction the front of the net 29 is juxtaposed to the walls and floor or bottom of the net 29; but the rear end of the net 39 is spaced from the bottom and side walls of the net 29 while the rear end of this net 39 is provided with an opening at 40. This open end of the net 39 terminates in front of the rear end of the net 29, so that when the fish pass through the opening 40 they are still within the net 29. As it is according to the nature of a fish to follow along a wall, the fish which pass through the opening 40 move forward into the space between the inner and outer nets and are entrapped therein. Flexible elements or guys 41 and 42 hold the rear end of the inner net open and in the spaced relation shown in Figs. 1, 2 and 3.

In order that the fish may be perfectly guarded against escaping from the rear end of the net 29, I may provide a guard net 43, but this guard net is not strictly essential.

For the purpose of folding or collapsing the nets while elevating them, cables 44 are provided each having one end secured to the winch 10, and each having its middle portion secured to the middle front portion of the net 29, as indicated at 45, the intermediate portion of each cable 44 passing over a pulley 46 and through apertures 47 of the beams 25. The cables 44 may also pass through loops 48 which connect these cables with the front edge of the net 29. The cables 44 are slidable through the opening 47 and loops 48, and it is to be understood that pulleys may be substituted for the apertures 47 and loops 48. From the foregoing description of the cables 44 and their connections, it will be seen that they are operable to draw the front ends of the booms 19 and beams 25 toward one another when the cables 22, 35 and 37 are released.

In view of the foregoing description of the construction and arrangement of parts, it will be seen that when fish are entrapped in the space between the inner and outer nets, they may be removed either by hoisting the nets so as to dump the fish into a suitable receptacle (not shown), or the fish may be removed by means of a drop net or other suitable means.

The operation of folding the nets and hoisting them into the position shown in Fig. 5, consists of loosening the cables 37 somewhat and loosening the cables 35 so as to allow free play of the strut 30 in the slots 31; whereupon the winches 10 and 11 are operated so as to wind the cables 20 and 44 thereon, and this operation causes the cables 44 to first draw the front ends of the beams 25 inward and upward until they have come into contact with the booms 19, and the continual inward movement of the beams 25, now causes the booms 19 to move horizontally into parallelism with one another and then to a somewhat forwardly converging relation until their horizontal movement is stopped by their contact with one another, whereupon, the cable 44 and the winch 11 coöperate with the cable 20 and winch 10 for completing the hoisting of the beams 25, and the latter then coöperate with the mast, cables and winches for hoisting the booms and the net supported thereby. A pawl and ratchet mechanism 49 may be provided for each of the winches 10 and 11, so as to prevent retrograde movement of these hoisting devices and this renders it possible for one person to operate both winches, by first operating a handle or crank 50 of the winch 10 and then operating a similar handle 50 of the winch 11, and thus alternating this operation until the structure is completely hoisted, whereupon, the hoisting structure may be lashed to the mast 8 as an additional means of obtaining perfect safety.

Although I have described this embodiment of my invention very specifically, it is not intended to limit this invention to these exact details of construction and arrangement of parts, but I am entitled to make changes within the scope of the inventive idea disclosed in the foregoing description and following claims.

What I claim as my invention is:

1. The combination with a supporting craft having a mast at its bow, of a pair of booms movably secured to said bow and normally diverging forwardly of the bow, a net carried by said booms, and means connected to said net and engaging the booms and coöperative with said mast for first moving said booms horizontally.

2. The combination with a supporting craft, of a pair of booms secured to the craft and normally extending forwardly thereof, a pair of beams normally under said booms respectively, a net extending from one to the other of said beams and from the latter to said booms and supported by said beams and booms, and adjustable means coöperative with said beams and booms for stretching the net.

3. The combination with a supporting craft, of a pair of booms secured to the craft and normally extending forwardly thereof, a pair of beams normally under said booms respectively, a net extending from one to the other of said beams and from the latter to said booms and supported by said beams and booms, adjustable means coöperative with said beams and booms for stretching parts of the net between said beams and booms, and means coöperative with said beams and booms and with the first said means, for stretching the part of said net between said beams.

4. The combination with a supporting craft, of a pair of booms secured to the craft and normally extending forwardly thereof, a pair of beams normally under said booms respectively, a net extending from one to the other of said beams and from the latter to said booms and supported by said beams and booms, a pair of bars each pivotally connected to one of said beams and slidably engaged with one of said booms but incapable of longitudinal movement across the latter, and means coöperative with said beams and booms and bars for stretching each part of the net between one of said booms and the corresponding one of said beams.

5. The combination with a supporting craft, of a pair of booms secured to the craft and normally extending forwardly thereof, a pair of beams normally under said booms respectively, a net extending from one to the other of said beams and from the latter to said booms and supported by said beams and booms, and a net within the first said net and having its forward end contiguous to the inner surface of the first said net and having its rear end spaced from said inner surface so as to form a barrier against the escape of the fish in the space between the nets, the rear end of the inner net being open to allow entrance of fish into said space.

6. The combination with a supporting craft, of a pair of booms secured to the craft and normally extending forwardly thereof, a pair of beams normally under said booms respectively, a net extending from one to the other of said beams and from the latter to said booms and supported by said beams and booms, and a pair of forwardly and upwardly turned skids on the front ends of said beams.

In testimony whereof I have hereunto set my hand.

LORENZO R. GAGE, Sr.

Witnesses:
CLARA ANSORGE FULLER,
C. W. HODGDON.

Copies of this patent may be obtained for five cents each, by addressing the "Commissioner of Patents, Washington, D. C."